US008066161B2

(12) United States Patent
Green et al.

(10) Patent No.: US 8,066,161 B2
(45) Date of Patent: Nov. 29, 2011

(54) HANDS-FREE LIFTING AND CARRYING APPARATUS

(76) Inventors: Robert D. Green, New York Mills, NY (US); Jonathan G. Wilson, Utica, NY (US)

( * ) Notice: Subject to any disclaimer, the term of this patent is extended or adjusted under 35 U.S.C. 154(b) by 1148 days.

(21) Appl. No.: 11/827,977

(22) Filed: Jul. 13, 2007

(65) Prior Publication Data
US 2009/0014483 A1   Jan. 15, 2009

(51) Int. Cl.
*A45F 3/04* (2006.01)
*A61G 1/00* (2006.01)
(52) U.S. Cl. .......................... 224/157; 224/158
(58) Field of Classification Search .............. 224/157, 224/158, 184, 269; 254/409; 182/5
See application file for complete search history.

(56) References Cited

U.S. PATENT DOCUMENTS

| | | | |
|---|---|---|---|
| 2,495,804 A | 1/1950 | Berchtold | |
| 2,710,975 A | 6/1955 | Stoen et al. | |
| 2,931,629 A * | 4/1960 | Keller | 254/409 |
| 3,486,671 A | 12/1969 | Sanders | |
| 3,659,760 A | 5/1972 | Blood | |
| 3,734,367 A | 5/1973 | Jackson | |
| 3,964,182 A | 6/1976 | Pomeret et al. | |
| 4,087,030 A | 5/1978 | Knight | |
| 4,168,793 A | 9/1979 | Knight | |
| 4,177,877 A * | 12/1979 | Gallinati | 182/3 |
| 4,272,852 A * | 6/1981 | Bell | 2/94 |
| 4,286,740 A | 9/1981 | Knight | |
| 4,676,418 A | 6/1987 | Lowe | |
| 5,184,764 A | 2/1993 | Orovan et al. | |
| 5,440,761 A | 8/1995 | Abrams et al. | |
| 5,474,278 A | 12/1995 | Cleveland | |
| 5,503,314 A | 4/1996 | Fiscus | |
| 5,544,363 A | 8/1996 | McCue et al. | |
| 5,806,740 A | 9/1998 | Carlson | |
| 5,820,141 A | 10/1998 | Wilkerson et al. | |
| 5,890,227 A | 4/1999 | Brown | |
| 5,897,131 A | 4/1999 | Brown et al. | |
| 5,927,438 A * | 7/1999 | Ostrobrod | 182/241 |
| 5,950,886 A | 9/1999 | Maupin | |
| 6,233,740 B1 | 5/2001 | Meyers et al. | |
| 6,315,177 B1 | 11/2001 | Weatherall et al. | |

(Continued)

FOREIGN PATENT DOCUMENTS

| | | |
|---|---|---|
| DE | 20214551 | 1/2003 |
| WO | WO 2005089873 A1 * | 9/2005 |
| WO | WO-2005112689 | 12/2005 |

OTHER PUBLICATIONS

International Search Report and Written Opinion of the International Searching Authority for PCT/US2008/069455 mailed Oct. 9, 2008 (10 pgs.).

*Primary Examiner* — Justin Larson
(74) *Attorney, Agent, or Firm* — Harris Beach PLLC

(57) ABSTRACT

A hands-free rescue/carrying apparatus includes at least one body-worn garment having a front facing side and a rear facing side, and at least one adjustable lift mechanism attached to the at least one body-worn garment. The at least one lift mechanism is attachable to an article to be supported and is designed to provide a substantial mechanical advantage as to the weight of the article, when employed. Advantageously, the garment having the at least one lift mechanism permits selective dynamic lift capability of the article to which it is attached and secured in a substantially hands-free manner.

31 Claims, 6 Drawing Sheets

U.S. PATENT DOCUMENTS

| | | |
|---|---|---|
| 6,446,849 B1 | 9/2002 | Schleifer |
| 6,729,511 B2 * | 5/2004 | Dent, III ........................ 224/259 |
| 6,968,600 B2 | 11/2005 | Marcaccio et al. |
| 7,044,496 B2 | 5/2006 | Holmes |
| 7,077,447 B1 | 7/2006 | Betway |
| 2004/0056056 A1 * | 3/2004 | Fabricius ........................ 224/262 |
| 2004/0178238 A1 | 9/2004 | Le Gal et al. |
| 2006/0113147 A1 * | 6/2006 | Harris ........................ 182/3 |

* cited by examiner

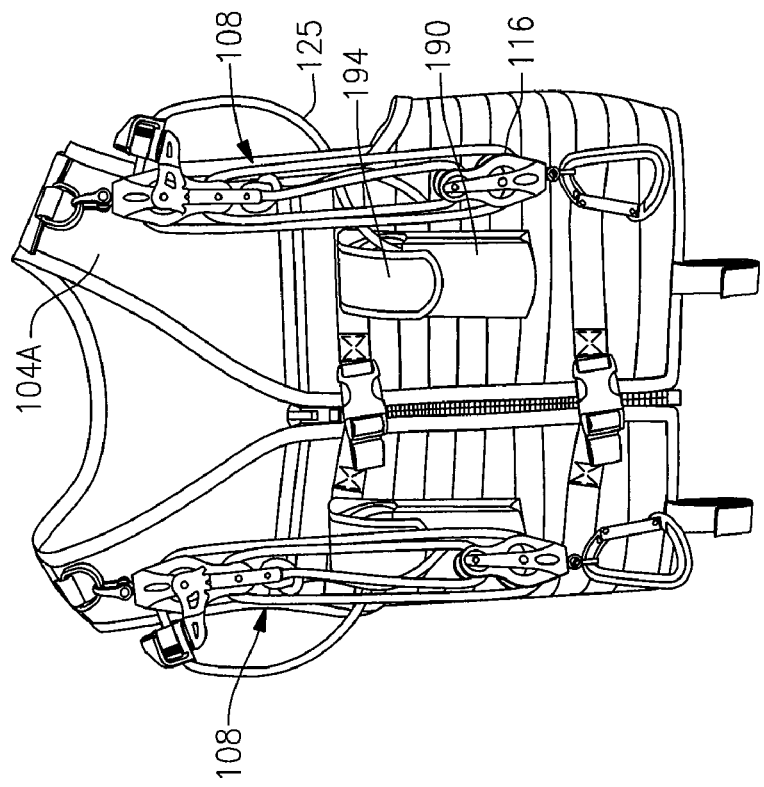
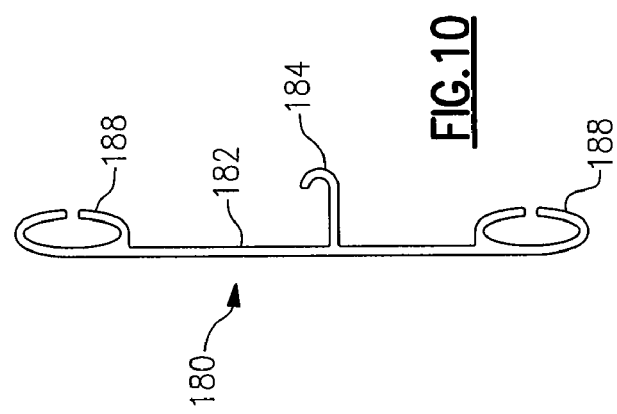

HANDS-FREE LIFTING AND CARRYING APPARATUS

FIELD OF THE INVENTION

The invention relates to the field of rescue apparatus and more particularly to a rescue or carrying apparatus that enables selective dynamic adjustment of a supported litter or other article while the apparatus is worn without having to first lower the article, thereby creating the opportunity for the carrier to have his or her hands remain free to be involved in non-lifting and non-carrying activities.

BACKGROUND OF THE INVENTION

One problem confronted by rescue workers is that relating to a person who has become injured at a remote location; for example, a skier or snowboarder who becomes injured while on the slopes. Conventionally, the injured person is placed onto a litter, gurney or other supporting or carrying structure. Two or more persons grip the litter frame on opposing sides thereof using their hands and arms to lift and carry the person to a hospital or other care station for treatment.

Obviously, the weight of the injured individual or other article that is being supported and carried is a concern to the rescue workers. Equally, if not more important, is the position of the injured person on the gurney, Stokes litter, backboard, rescue litter, toboggan or other support, especially if the injury involved requires the injured person to be supported in a specific manner; e.g., head being raised at a higher position than the chest. To that end, the degree to which injured persons can be carried is influenced, for example, by the surrounding terrain, such as sloped surfaces, stairwells and the like as well as the relative heights and strength of those persons who are actually lifting and carrying the supported article. With regard to injured individuals, time is often of the essence in that it is generally known that any care that can be administered within the first hour can greatly impact recovery, including stabilization of the injurious condition and transport to the next level of care.

In addition, there are also numerous and varied rescue situations involving invalid persons, those who are handicapped and unable to move without assistance from others, and/or those confined to wheelchairs or walkers. For example and during the events of Sep. 11, 2001, numerous injured individuals remained trapped within the confines of buildings without power, necessitating the removal of those individuals along stairwells in extremely hazardous conditions.

Known supporting devices, such as those described by Knight in U.S. Pat. Nos. 4,286,740 and 4,087,030, permit a supported article to be lifted by four (4) individuals. Each of the individuals according to these references wears a rigid backpack frame, wherein a pair of horizontal bars extend transversely relative to the axis of the litter. These bars are supported by the backpack frame at the rear thereof. The foregoing assembly provides adequate support for a litter and enables "hands-free" operation while an injured person is supported and carried using the apparatus. The apparatus provides adjustability when a litter is initially lifted, but further dynamic adjustments cannot be performed, to adjust for varying terrain, for example, by the individuals who are actually carrying the litter. Therefore, all future adjustments must be made by first lowering and disconnecting the litter and then adjusting the height of at least one of the horizontal bars or by having the adjustments made by a fifth individual who is not wearing the apparatus. Variations of the foregoing apparatus design are shown and described in U.S. Pat. No. 4,168,793. In this version, a motorized winch mechanism is attached to the side of the rigid backpack frames and used to selectively lift the horizontal bar. The frames and associated winch mechanism herein described, however, are relatively bulky and rigid and the support mechanism is specifically designed to carry and maintain only one type of supported article (e.g., the litter), while still requiring use by four or more individuals.

SUMMARY OF THE INVENTION

According to one aspect, there is provided a hands-free rescue apparatus comprising at least one body-worn garment having a front facing side and a rear facing side, and at least one adjustable lift mechanism attached to said at least one garment, said at least one lift mechanism being attachable to an article to be lifted and carried by the at least one lift mechanism.

According to one version, the at least one lift mechanism includes first block and a second block that are axially aligned with one another. Each of the first and second blocks include at least one pair of pulleys and a cable rove therethrough.

The at least one lift mechanism further includes at least one cleat or other locking mechanism to lock the wound rope or cable that is rove through and between the first and second blocks to permit movement of the second block in one axial (lifting) direction and to selectively prevent movement thereof in an opposite axial direction.

According to another version, a pair of lift mechanisms can be integrally formed with the garment or can be releasably attached thereto. In either instance, each lift mechanism is configured to be moved between the front facing side and the rear facing side of the garment, thereby enabling versatility in the use thereof and not necessarily requiring a "specific" garment to be worn depending on the relative location of the bearer. In one such version, the hooks can be provided either at the top of the garment at the shoulders of the wearer or alternatively on a flapped section of material that can be selectively moved between the front and rear facing sides of the garment.

Each of the first and second blocks of each lift mechanism is preferably mounted on a pivoting or rotatable mount to further permit flexibility in terms of mounting, the mechanisms being adapted to include carabineers, hooks, or other lifting connectors in conjunction therewith, enabling literally any form of article capable of support to be used in conjunction with the present apparatus.

According to another version, there is provided a dynamic lifting apparatus for supporting an article between at least two persons, said lifting apparatus comprising a first garment wearable by a first person, and a second garment wearable by a second person. According to this version, each of the first and second garments includes litter article securing means to permit securement of an article to be lifted to each of said garments and at least one adjustable lifting mechanism attachable to the first garment and said second garment for lifting and selectively adjusting the relative position of said lifted article. The adjustable lifting mechanism permits the vertical position of said article to be selectively and dynamically adjusted while said article is being carried between said first and second person without first requiring removal of said garments.

According to yet another version, there is provided an adjustable lift mechanism, said lift mechanism comprising a pair of axially disposed blocks, each of the blocks including at least one pulley and a cable rove through the blocks to create a block and tackle arrangement wherein one of said blocks is movable and the other of said blocks is fixed. The movable block includes a first connector to secure to an article to be lifted and the fixed block includes a second connector and a locking device in which an extending end of said rove cable can be pulled in a first direction and said locking device prevents said end from moving in an opposite second direction wherein the lift mechanism permits selective dynamic lifting capability of the article to which said first connector it is attached.

One advantage realized in the use of the herein described rescue/carrying apparatus is that literally any form of supporting article can be lifted. Moreover, the positioning of the persons who are lifting and carrying the article is not dictated by the garment design in that the position of the lift mechanisms is flexible.

Another advantage is that the relative position of a supported article can be selectively adjusted by the wearer of the herein described apparatus. This adjustment can therefore take place dynamically or "on the fly" and does not require that the article or individual first be lowered prior to making an adjustment.

Yet another advantage of the present apparatus is that both lifting and adjusting operations are relatively easy to accomplish in that the apparatus does not require significant training or skill to use or require replacement of motorized parts. Moreover, a mechanical advantage is realized by use of the herein described lift mechanism.

Yet still another advantage of the herein described apparatus is that all of the lifting support is provided by the herein described lifting mechanisms and the body of the wearer and therefore wearers of the herein described apparatus are permitted to otherwise use their hands other than for lifting. Because the apparatus is "hands-free", the persons wearing the apparatus retain the ability to negotiate difficult terrain, steep slopes and the like, such as through the use of walking sticks and ski poles. In addition, the wearers of the herein described apparatus can also carry and utilize other devices for navigation purposes, such as compasses, or to carry other devices; for example, sidearms, to protect themselves in a hostile environment.

Yet another advantage is that because the lift mechanism of the apparatus is axial in design, there is less tendency for twisting and possible binding is minimized, thereby assuring consistent and reliable operation.

These and other features and advantages will be readily apparent from the following Detailed Description which should be read in conjunction with the accompanying drawings.

BRIEF DESCRIPTION OF THE DRAWINGS

FIG. 9 is a perspective view of a rescue apparatus garment that is made in accordance with another embodiment of the invention; and FIG. 10 represents a side view of a hook member attachable to the garment of FIG. 1 or FIG. 9.

DETAILED DESCRIPTION

The following description relates to specific embodiments of a rescue lifting/carrying apparatus and method for use of the above apparatus. It will be readily apparent from the following description that numerous modifications and variations are possible. In addition, certain terms such as "top", "bottom", "above", "below" and the like are used throughout the description that follows in order to provide a suitable frame of reference with regard to the accompanying drawings. These terms are not intended to be limiting, however, except where specifically indicated.

Figure 1:
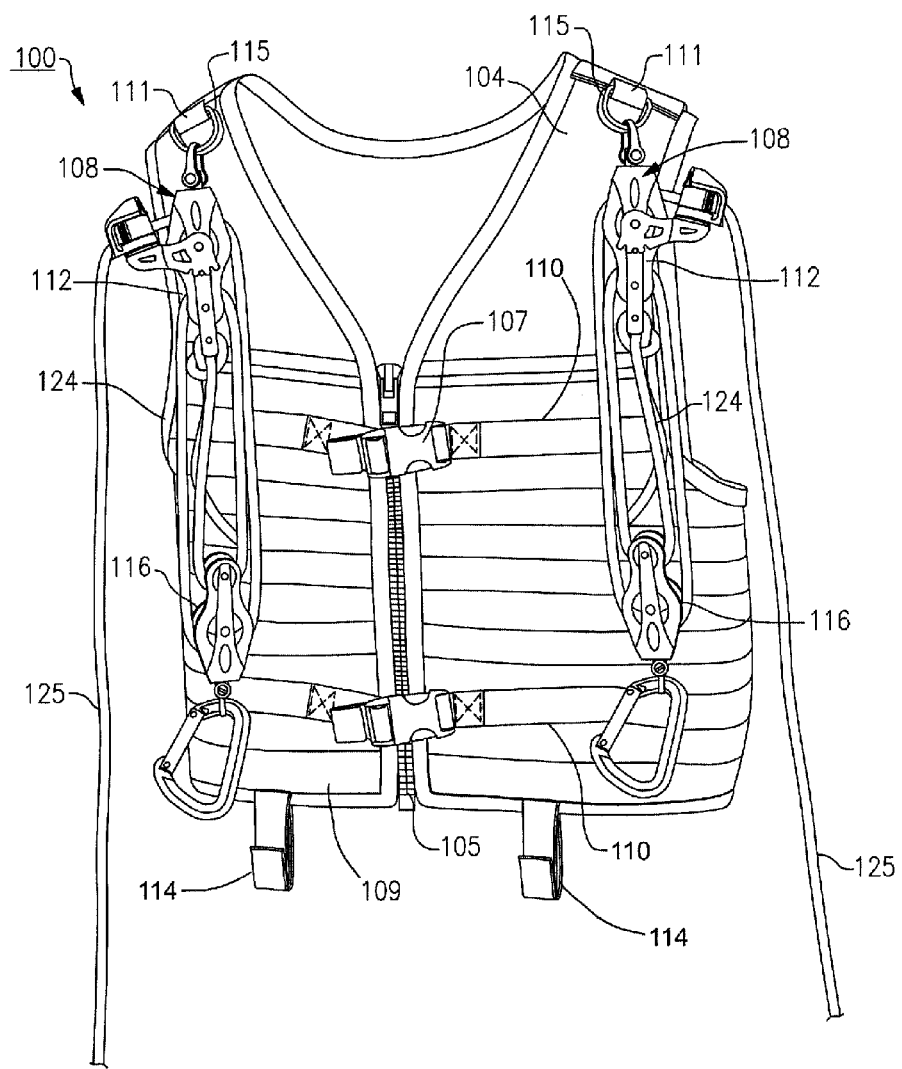
FIG. 1 is a perspective view of a rescue apparatus garment made in accordance with an embodiment of the present invention.

Referring to FIG. 1, there is shown a rescue lifting/carrying apparatus 100, the apparatus being defined by a vest-like garment 104 that is worn by a rescue worker, emergency aide, EMT, or other individual or wearer (not shown in this view). The vest-like garment 104 is defined by a covering shaped to cover the upper torso of the wearer that is fabricated from an extremely tough, light weight, weather resistant and durable material such as for example, nylon, ballistic nylon, Kevlar, rip stop nylon or a Mylar-type or other fabric or material that is preferably light and flexible with excellent strength. The garment 104 according to this embodiment includes a zipper 105, which is arranged along a front facing side 109, as well as a plurality of adjustable snap buckles 107 or other engagement and/or adjustment means to ensure snug engagement about the chest of the wearer. In addition, the garment 104 includes a plurality of spaced horizontal straps 110 sewn into the garment. The straps 110 are made from a flexible durable material, such as nylon, with hook and loop fasteners sewn therein. The straps 110 are sewn at their respective ends to the garment 104 and permit the engagement of hook members 180 that can be attached either to the straps and/or ends of a pair of loops 114 provided at the bottom of the garment. The purpose of the hook members 180 is described in a later portion.

According to this embodiment, a pair of loops 111, each stitched into the garment 104 adjacent to the apex of the shoulders of the wearer includes a bracket 115, the latter being used according to this embodiment to receive a lift mechanism 108. Alternatively, the stitched loops 111 can be provided within a flapped portion (not shown) of the garment 104, permitting the bracket 115 to be selectively moved between the front facing side 109 and a rear facing side 113. According to the present embodiment, the lift mechanism 108 is fixedly attached to the bracket 115. However and as described in greater detail below, the lift mechanism(s) 108 can also be removably attached to the garment 104, such as through use of a carabineer (not shown in this view, but shown as 152 in FIG. 3).

The foregoing attachment features creates a number of advantages to the wearer(s) of the apparatus 100 in that there no issues relating to the positioning of multiple individuals in carrying an article or that certain garments 104 have to he specifically worn depending on whether the individual wearer is in front or at the rear relative to a supporting apparatus or article.

Figure 2:
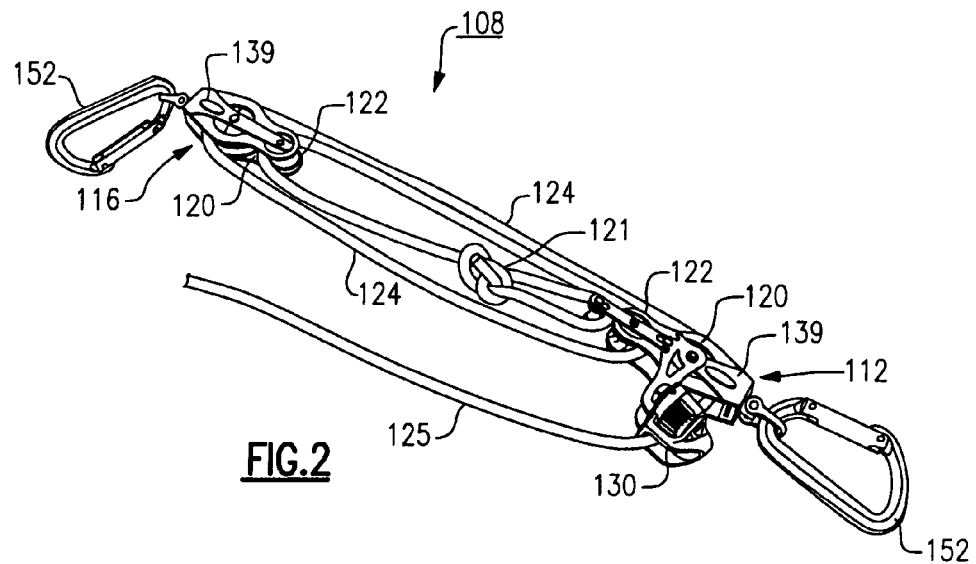
FIG. 2 is a perspective view of a lift mechanism used in the rescue apparatus of FIG. 1.
Figure 3:
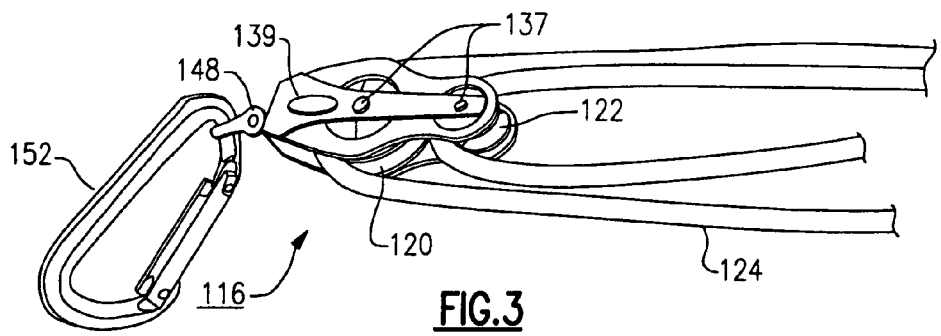
FIG. 3 is an enlarged perspective view of the lower block of the lift mechanism of FIG. 2.
Figure 4:
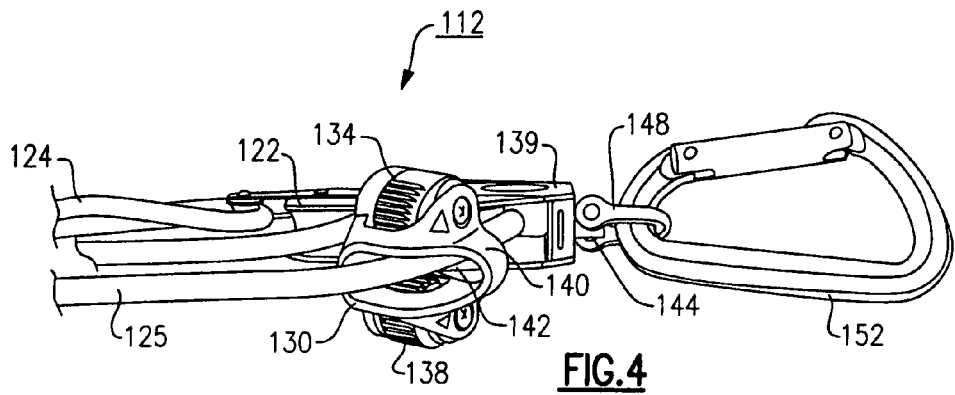
FIG. 4 is an enlarged perspective view of the upper block of the lift mechanism of FIG. 2.

Referring to FIGS. 2-4, an exemplary lift mechanism 108 for use with the apparatus 100 includes a pair of blocks; namely, a first or upper block 112 and a second or lower block 116, each of which are arranged in an axial manner relative to one another. Each block 112, 116 according to this embodiment commonly includes a pair of sheaves 120, 122 that are supported one above the other in axial relation within a frame 139 and support a rope or cable 124 that is wound or rove therethrough, thereby interconnecting the upper and lower blocks. Each sheave 120, 122 is rotatably supported within each block 112, 116 by means of pins 137 extending through their centers and within the block frame 139. The rope or cable 124 is preferably a coated high strength line, such as kernmantle rope, line, Kevlar core static line, diamond braid line or the like, that is threaded through and between each of the sheaves 120, 122 of each block 112, 116. One end 121 of the rope 124 is internally secured within the lift mechanism 108 and an opposing end 125 outwardly extends from the upper block 112 to permit control by a user, as described in greater detail below.

A cleat 130 is further disposed in relation to the upper block 112 of the lift mechanism 108, the cleat including a pivotally supported movable pair of camming elements 134, 138 attached to a cleat frame 140 and forming a nip 142 to essentially lock the cable end 125 when pulled therethrough in a first axial direction. The cleat 130 is supported on a frame adjacent to the top of the uppermost sheave 120 of the upper block 112. A suitable cleat for this purpose is described in U.S. Pat. No. 4,084,532, the entire contents of which are herein incorporated by reference.

A swivel block 144 is attached to the top surface of the upper block 112 and the bottom surface of the lower block 116. The swivel block 144 includes a clevis 148 that supports a carabineer 152 or other means that is used to engage the garment 104, FIG. 1, and the article (e.g. litter) to be supported by the apparatus 100, FIG. 1.

The entire lift mechanism 108, according to this described embodiment, is mounted along a single axle wherein each pair of tandem sheaves 120, 122 are mounted within each block 112, 116 and in which the cable or rope 124 is rove through the sheaves of each matching block to thereby form a tackle. In the block and tackle arrangement herein described, the upper block 112 is stationary while the lower block 116 is movable in an axial direction. In this described construction, the lift mechanism 108 provides a 4:1 mechanical advantage based on the block and tackle arrangement thereby created.

By providing a pair of lift mechanisms 108 for a single body-worn garment 104, as described in greater detail below, an effective 8:1 mechanical advantage is realized by a user with regard to a supported litter or other article, meaning that for lifting purposes a weight of 160 pounds is effectively reduced to that of 20 pounds by means of the lift mechanism. By having multiple wearers in relation to a single article, additional mechanical advantages are realized. Each lift mechanism 108 is operated independently or can be operated in tandem by the wearer.

Figure 5:
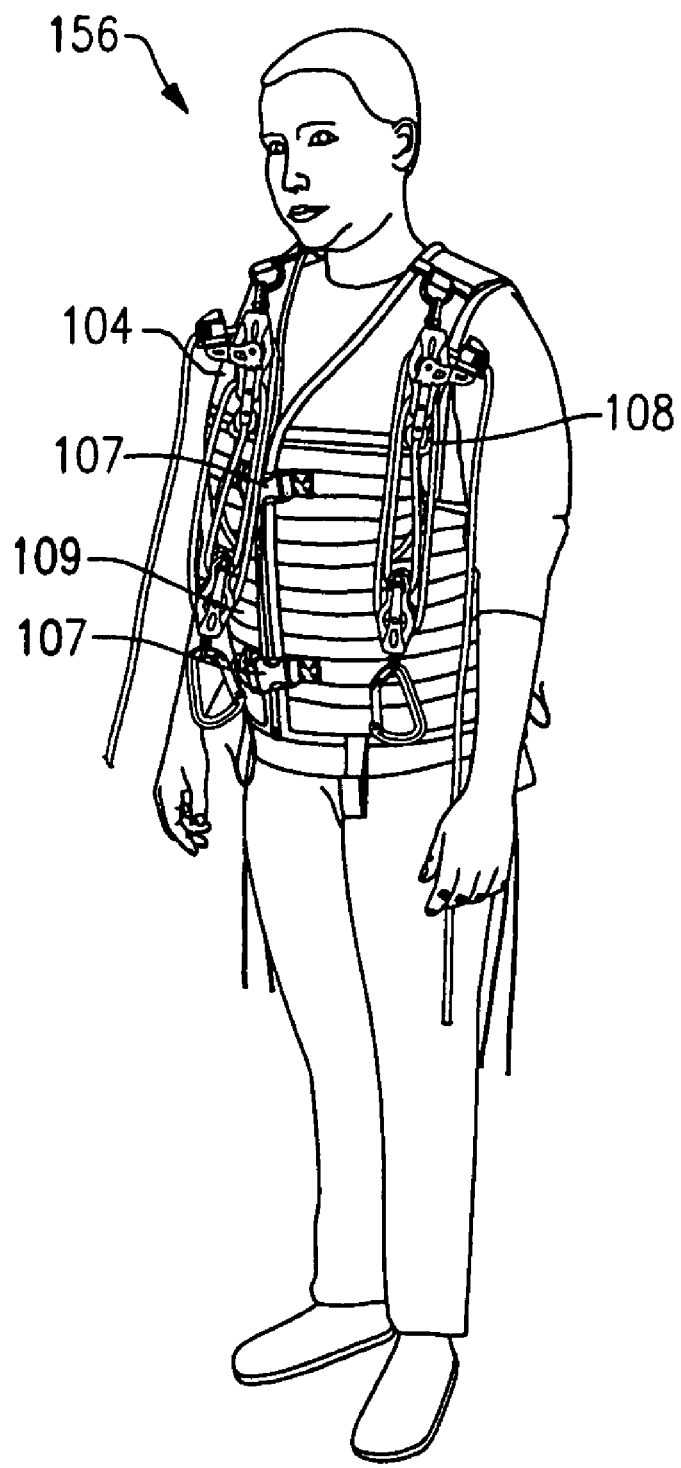
FIG. 5 is a perspective view of the rescue apparatus of FIG. 1, as worn in one configuration by a user.

Referring to FIG. 5, the body-worn garment 104 is shown as worn by a rescue worker 156 or other individual. The garment 104 as noted is a vest-like member that is worn about the chest of the wearer 156. As shown in this figure, a pair of lift mechanisms 108 is provided on the front facing side 109 of the garment 104, wherein each lift mechanism 108 is independently adjustable by pulling downwardly on the extending end 125 of the roved cable 124.

Figure 6:
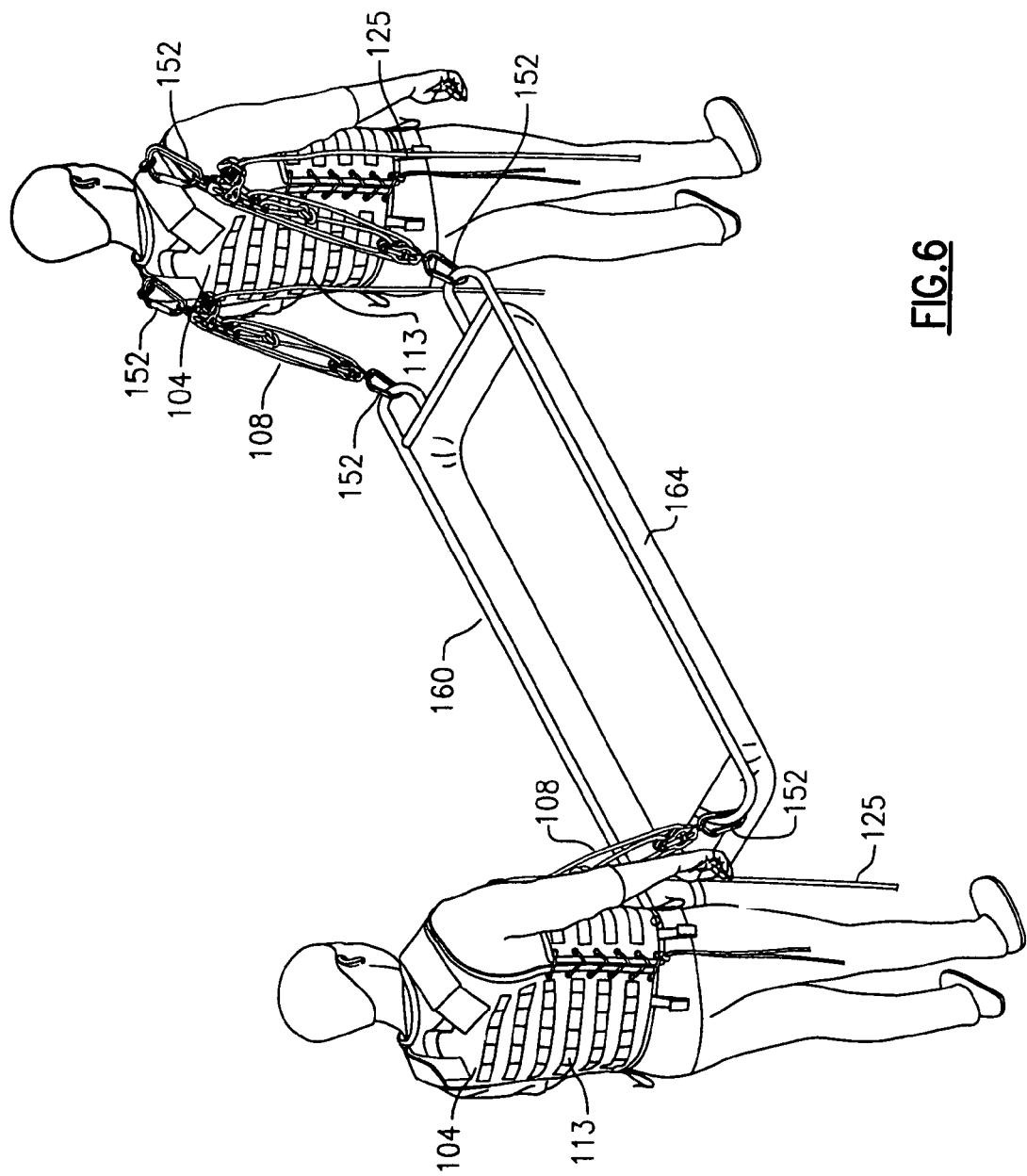
FIG. 6 illustrates a pair of users, each wearing the rescue apparatus in conjunction with a lifting and carrying operation of a litter depicting duality as to front and rear usage of the apparatus.
Figure 7:
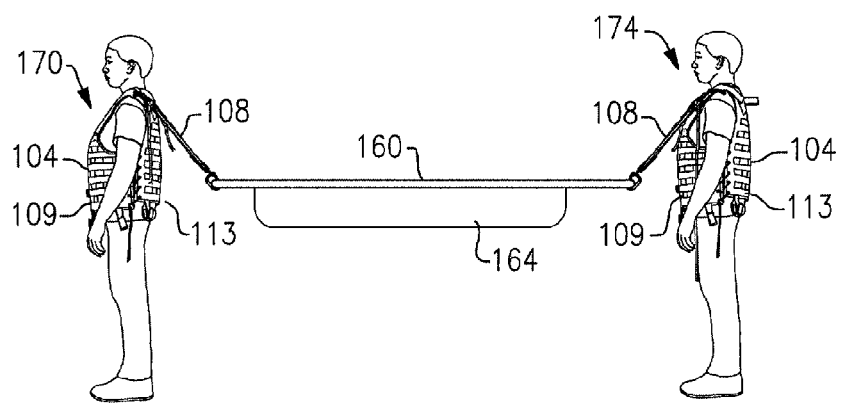
FIG. 7 is a side elevational view of the carrying operation depicted in FIG. 6.
Figure 8:
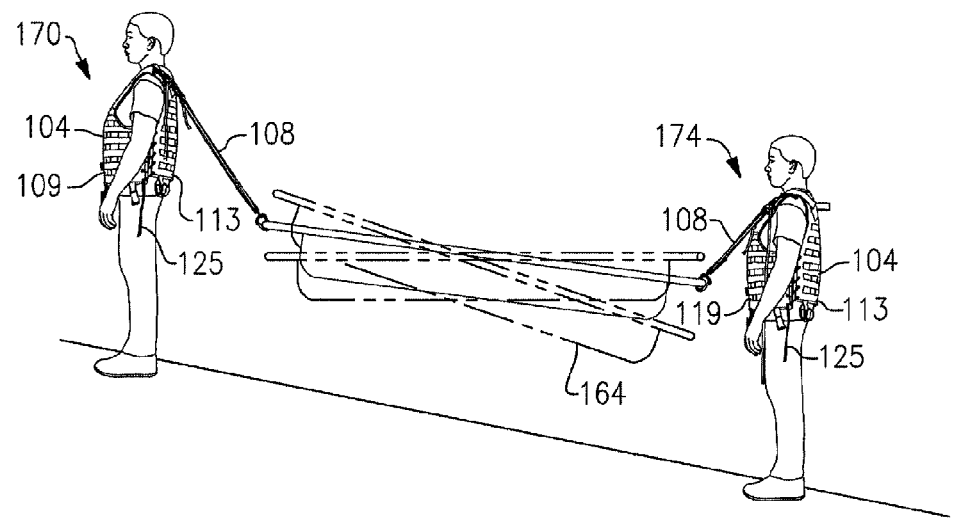
FIG. 8 illustrates a side elevational view of FIG. 6, depicting the adjustability of the lift mechanisms of the rescue apparatus in a carrying operation, for example, relative to a sloped terrain surface.

In operation and referring to FIGS. 6-8, a pair of rescue workers 170, 174, each wearing a garment 104 are disposed on opposing sides of a litter or other supporting article 160, such as a gurney, Stokes litter, toboggan, etc. In this instance, carabineers 152 are used to attach the lower block 116, FIG. 2, of each lift mechanism 108 to the litter frame 164. Because the lift mechanisms 108 can easily be shifted between the front and rear facing sides 109, 113 of the garment 104, there are no issues concerning there having to be separately designed garments.

Moreover, the relative horizontal position of the supported article (e.g., litter 160) can be selectively adjusted by the wearers 170, 174 dynamically; that is, on the fly based on changes in the terrain or the like. As shown, this adjustment can be made by either pulling the end 125 of the cable 124 to bring the litter 160 higher in relation to the ground or by releasing the cleat 130, unlocking the mechanism 108, FIG. 2, and permitting the litter 160 and injured person carried thereupon (not shown) to be selectively lowered to a new position. The cleat 130 can then be reengaged to lock each lift mechanism 108, FIG. 2, in the resulting position.

In addition to the above lifting capability, the litter frame 164 can also be brought to rest against either wearer 170, 174 to aid in support thereof. According to one version (not shown), each of the front and rear facing sides 109, 113 of the garment 104 can include a pair of vertical channels made from a plastic or other durable material that is sewn or otherwise attached to the garment. Each of the vertical channels according to this version include at least one hook member having a base section that is movably secured within the channel wherein the hook member is adjustably movable along the length thereof. In a preferred version, the channel is sufficiently flexible and malleable wherein inward pressure of the hook member will locally deform the channel and prevent further movement, effectively locking the position of the hook member until the hook member is pulled outwardly away from the wearer. Alternatively and referring to FIG. 10, a set of hook members 180 can be used in combination with the horizontal straps 110 provided on either of the front and rear facing sides of the garment. Each of the hook members 180 according to this version is defined by a strap-like component 182 having a hook element 184 disposed outwardly at an intermediate portion of its length. Each end of the hook member 180 includes a pair of snaps 188 that are secured about a selected strap 110. Alternatively, the snaps can be replaced with other securing means. For example and in the instance in which the straps 110 include a hook or loop fastener, the hook members 180 can include the other of hook and loop fasteners to provide releasable engagement with the straps, wherein the hook members can be set laterally and vertically as needed. The hook element 184 would be positioned to engage the litter frame 164 and permit the frame to be supported in close to the wearer of the garment.

In addition and referring to FIG. 9, a variation of the garment 104A is herein depicted. According to this version, the garment 104 can also further include at least one and preferably a pair of pockets 190, the pockets being sized to retain the excess length of the rope end 125 extending from the attached lift mechanism 108. Preferably, each pocket 190 is located to permit the wearer to access the portion of the rope end 125 that immediately or proximately exits the upper block of the lift mechanism 108, wherein the pocket is used to retain and excess length and prevent potential injury to the wearer. To that end, the pocket 190 includes a cover or flap 194 having hook and loop fasteners that fasten upward relative to the wearer, the cover being slightly more narrow in width than the remainder of the pocket to aid in storage, while not impacting the load. The herein described pocket 190 is pleated and can include a snap or utilize hook and loop fasteners to enable opening and closure. In yet another variation, the pockets can be used to support a portion of the lift mechanism 108, either releasably or fixedly wherein the lower block 116 of the lift mechanism 108 can be stored in the pockets 190, thereby aiding in a smoother and sleeker profile of the garment 104 as the wearer approaches an injured person. The presence of the pockets 190 further aid in noise reduction caused by the dangling lift mechanism(s) 108, thereby enabling the wearer/rescue worker to be better suited to listen for the injured person.

In addition to the foregoing, the interior of the garment 104 can further include at least one pocket that is provided on the front and/or rear facing sides thereof. These pockets can be opened using zippers, snaps or other means wherein the interior of the pockets is sized to permit the inclusion of a hard flexible supporting or backing material, in the form of at least one liner or insert. The liner or insert is made from a hard plastic or other suitable material, the interior pockets and the liners or inserts aiding in preventing the wearer of the garment from being bruised, for example, by the litter 160, FIG. 6, or other supporting article. The garment can also be equipped to support and host intravenous (IV) attachments, for example, for replenishment (e.g., dextrose) or for blood transfusions and the like.

PARTS LIST FOR FIGS. 1-10

100 rescue/lifting apparatus
104 vest-like garment
104A garment
105 zipper
107 snap buckles
108 lift mechanism
109 front facing side—garment
110 straps
111 loops
112 block, upper or first
113 rear facing side—garment
115 bracket
116 block, lower or second
120 sheaves
121 secured end, rope
122 sheaves
124 cable or rope
125 cable or rope end
130 cleat
134 pivotable camming element
137 pins
138 pivotable camming element
139 frame, block
140 cleat frame
142 nip
144 swivel block
148 clevis
152 carabineers
156 wearer
160 litter
164 litter frame
170 wearer
174 wearer
180 hook members
182 strap-like component
184 hook element
188 snaps
190 pocket
194 cover or flap Though a single embodiment has been disclosed herein, it should be readily apparent that other modifications and variations are possible. For example, the lift mechanism herein described can also be used in conjunction with other apparatus apart from the body-worn vest-like garment, such as a harness, a backpack or other apparatus that allows securement in conjunction with a wearer. Other modifications and variations will be readily apparent and that are within the intended scope of the following claims.

We claim:
1. An apparatus comprising:
at least a pair of body-worn garments and a supported article, in which each of the body-worn garments has:
a front facing side and a rear facing side; and
at least one adjustable lift mechanism attached to said at least one body-worn garment, said at least one lift mechanism being attachable to an article to be supported by said at least one lift mechanism;
said at least one lift mechanism comprising a first block and a second block axially aligned with one another, each of said first and second blocks comprising at least one pair of pulleys and a cable wound through the pulleys;
wherein the pair of body-worn garments are wearable by at least two persons, each of said body-worn garments including at least one lift mechanism that is attached to said garment and to said supported article, respectively; and
wherein an extending end of the cable extending from said at least one lift mechanism, on each of the body-worn garments, is acted upon to control the vertical movement of said supported article, and said at least one lift mechanism includes a locking mechanism to lock the extending end of said cable in one direction.

2. An apparatus as recited in claim 1, wherein each of said body worn garments is configured such that said supported article can be interchangeably and selectively attachable to either the front facing side or the rear facing side of each of said body worn garments.

3. An apparatus as recited in claim 1, wherein said supported article is a litter.

4. An apparatus as recited in claim 1, wherein said lift mechanism includes carabineers attached to at least one of said first block and said second block to releasably engage at least one of said article and said garment.

5. An apparatus as recited in claim 1, wherein said at least one lift mechanism is configured to be attached to multiple types of articles for lifting and carrying thereof.

6. An apparatus as recited in claim 1, wherein said at least one body worn garment can be adjustably fitted to the wearer thereof.

7. An apparatus as recited in claim 1, wherein said apparatus includes at least one swivel block attached between said lift mechanism to said at least one body-worn garment.

8. An apparatus as recited in claim 7, wherein each of said first block and said second block are rotatably supported about a common axis of said lift mechanism.

9. An apparatus as recited in claim 1, wherein said first block of said at least one lift mechanism is attached to said body-worn garment and the second block of said at least one lift mechanism comprises an attachment component configured to be attachable to said supported article to be lifted by said at least one lift mechanism.

10. An apparatus as recited in claim 9, wherein said lift mechanism is releasably attached to said at least one garment.

11. An apparatus as recited in claim 9, wherein an extending end of said cable is pulled by a wearer of said garment to control the lifting of a connected article, said at least one lift mechanism further including a locking mechanism to lock the position of an extending end of said cable in one axial direction.

12. An apparatus as recited in claim 11, wherein said locking mechanism is selectively releasable to permit vertical adjustment of a supported article while the garment is worn.

13. An apparatus as recited in claim 1, wherein each said locking mechanism is selectively releasable to permit vertical adjustment of a supported article by each individual.

14. An apparatus as recited in claim 13 in which said locking mechanism comprises a cleat.

15. An apparatus as recited in claim 13 in which said locking mechanism comprises a pair of opposing pivotable camming elements.

16. An apparatus as recited in claim 13 in which said apparatus comprises at least two of said adjustable lift mechanisms.

17. An apparatus as recited in claim 1, wherein said supported article comprises a litter frame, and the apparatus includes means for supporting said litter frame against said garment and maintaining a specific vertical height.

18. An apparatus as recited in claim 17, wherein said article supporting means includes at least one hook member extending from a facing side of said garment, the vertical position of said at least one hook member being selectively adjustable.

19. An apparatus as recited in claim 18, wherein said at least one hook member is attached to between horizontal spaced strap members provided on said garment.

20. An apparatus as recited in claim 1, wherein said garment includes at least one pocket.

21. An apparatus as recited in claim 20, wherein at least a portion of said lift mechanism is disposed within said pocket.

22. An apparatus as recited in claim 21 wherein said portion of said lift mechanism includes an extending end of said wound cable.

23. An apparatus as recited in claim 21, wherein said portion of said lift mechanism includes at least one block of said lift mechanism.

24. A dynamic lifting apparatus for supporting an article between at least two persons, said lifting apparatus comprising:
 a first garment wearable by a first person;
 a second garment wearable by a second person; and
 a supported article;
 wherein each of said first and second garments includes:
  article securing means to permit securement of said supported article to be lifted to each of said garments; and
  at least one adjustable lifting mechanism attachable to said first garment and said second garment for lifting and selectively adjusting the relative position of said lifted article, wherein said adjustable lifting mechanism permits the vertical position of said supported article to be selectively and dynamically adjusted while said supported article is being carried between said first and second person without first requiring removal of said garments;
 wherein said adjustable lifting mechanism comprises a pair of blocks axially aligned with one another, each of said blocks including a pair of axially defined pulleys, said arrangement forming a block and tackle and a cable wound through and between said blocks, wherein one block of said lift mechanism is attached to said article securing means, wherein an extending end of the cable is acted upon to control the vertical movement of said supported article, and said adjustable lifting mechanism includes a locking mechanism to lock the extending end of said cable in one direction.

25. An apparatus as recited in claim 24, wherein said supported article to be supported is a rescue support member.

26. An apparatus as recited in claim 24, wherein said supported article to be supported is a litter.

27. An apparatus as recited in claim 24, wherein said supported article to be supported is a wheelchair.

28. An apparatus as recited in claim 24, wherein said apparatus is a rescue apparatus.

29. An apparatus comprising:
 a first garment, a second garment, and a supported article, in which each of the first and second garments comprises:
 at least two lift mechanisms attached to the garment, in which each of the lift mechanisms provides a mechanical advantage and comprises:
 a pair of axially disposed blocks, each of said blocks including at least one pulley and a cable wound through the blocks to create a block and tackle arrangement wherein one of said blocks is movable and the other of said blocks is fixed;
 said movable block including a first connector to secure to the supported article; and
 said fixed block including a second connector and a locking device in which an extending end of said wound cable can be pulled in a first direction and said locking device prevents said end from moving in an opposite second direction, wherein said lift mechanism permits selective dynamic lifting capability of the supported article to which said first connector is attached.

30. A wearable device as recited in claim 29, wherein said first connector permits pivotal attachment to said garment.

31. A wearable device as recited in claim 29, wherein said first connector is attached to a swivel.

* * * * *